United States Patent Office 3,010,870
Patented Nov. 28, 1961

3,010,870
METHOD AND COMPOSITION FOR CONTROLLING NEMATODES EMPLOYING DITHIOOXAMIDE
Raymond W. Luckenbaugh, Wilmington, Del., assignor to E. I. du Pont de Nemours and Company, Wilmington, Del., a corporation of Delaware
No Drawing. Filed Mar. 23, 1960, Ser. No. 16,940
2 Claims. (Cl. 167—22)

This invention relates to the method of controlling nematodes by using dithiooxamide and to a particular composition utilizing its nematocidal properties.

According to this invention, dithiooxamide is used to treat nematode infested soil by application to the soil in an amount sufficient to exert the desired nematocidal action. The exact dosage necessary is, of course, dependent upon the type and quantity of nematodes to be controlled, duration of treatment desired, climatic conditions, soil type, the nature of the formulation used in the application, and the like.

As a practical matter, application rates of from 5 to 100 pounds of dithiooxamide per treated acre generally are satisfactory for nematode control, although higher rates can be used. The dithiooxamide, preferably in a suitable formulation, is applied for the protection of agricultural crops to cultivated land and mixed with topsoil. After application, the nematocidal compound is preferably worked into the ground to a depth of about 4 to 6 inches.

The compound of this invention has been found to be particularly effective in the treatment of nematode infested soil for home usage, and particularly in the treatment of soil in which ornamental plants are growing. Living plants are notoriously sensitive to the application of nematocidally active compounds, and unexpectedly advantageous nematode control can be obtained in such usages without injury to the surrounding plants by application of the compound of this invention.

A formulation that has been found to be especially advantageous in the application of the dithiooxamide to the nematode infested soil is a solid composition containing from 50% to 80% by weight of dithiooxamide, from 17% to 49.5% by weight of an inert powder diluent and from 0.5% to 3.0% by weight of one or more surface-active agents. Formulations containing lesser amounts by weight of dithiooxamide, say 10%, are occasionally useful for special purpose applications, such as hand dusting and the like.

The inert powder diluent is preferably selected from the group consisting of natural clays (such as attapulgite or china clays), diatomaceous earth, talc, walnut shell flower, redwood flower, synthetic fine silica, calcium silicate, and the like.

The surface-active agents employed are preferably selected from the group consisting of sodium oleate, sulfonated petroleum oils, alkyl aryl sulfonates, alkylated sodium sulfosuccinates, sodium lauryl sulfate, lignin sulfonates, polyethylene oxide derivatives of alkylated phenols, fatty or resin acids and their esters, and fatty alcohols, and the like.

As mentioned above, the dithiooxamide, preferably in the composition described above, is applied to the medium capable of supporting the growth of plants by any conventional method, such as spraying or dusting by hand or mechanical equipment.

The compositions can also contain other conventional additives of nematocidal compositions, such as gums, solvents, extenders, and dyes, as will be well understood in the art. For example such additives are disclosed in detail in Bluestone U.S. Patent No. 2,895,869, issued July 21, 1959.

The invention will be better understood by reference to the following illustrative examples.

Example 1

The following nematocidal composition is prepared by the conventional technique of first blending the active ingredient with the inert powder carrier and the surface-active agent, and then grinding the mixture in an impact mill to an average particle size below about 50 microns. This mixture is next reblended until completely homogenous.

| | Parts |
|---|---|
| Dithiooxamide | 75.00 |
| Sodium salt of alkylated naphthalene sulfonic acid | 1.75 |
| Methyl cellulose (low viscosity grade) | 0.25 |
| Attapulgite clay | 23.00 |

This powder formulation is applied with conventional spray equipment by dispersing in water at a spray concentration of about 5 pounds of formulation per ten gallons of water and applying to the soil at a rate between 15 and 50 pounds of dithiooxamide per acre of land infested with plant pathogenic nematodes. The composition is then worked into the coil.

Example 2

The following nematocidal compositions are prepared in a manner analogous to that of Example 1.

| | Parts |
|---|---|
| A. Dithiooxamide | 50.00 |
| Kaolin clay | 48.30 |
| Dioctyl sodium sulfosuccinate concreted with sodium benzoate | 0.70 |
| Goulac (sodium lignin sulfonate) | 1.00 |
| B. Dithiooxamide | 80.00 |
| Attapulgite clay | 17.75 |
| Sodium dodecylbenzene sulfonate | 2.00 |
| Methocel | 0.25 |
| C. Dithiooxamide | 60.00 |
| Kaolin clay | 39.00 |
| Sodium lauryl sulfate | 0.50 |
| Partially desulfonated sodium lignin sulfonate | 0.50 |
| D. Dithiooxamide | 80.00 |
| Attapulgite clay | 18.00 |
| Sodium salt of alkylated naphthalene sulfonic acid | 1.75 |
| Methocel | 0.25 |
| E. Dithiooxamide | 20.00 |
| Micaceous talc | 78.50 |
| Polyoxyethylene ester of mixed tall oil acids concreted with urea | 1.50 |

Example 3

The nematocidal composition of Example 2D is dispersed in water at a spray concentration of 15 pounds of formulation per 100 gallons of water. Using conventional equipment, the dispersion is applied as a drench at a rate of between 100 and 300 gallons per acre to land cultivated in strawberries for the control of the strawberry root-knot nematode (*Meloidogyne hapla*).

Example 4

The nematocidal composition of Example 2A is dispersed in water at a spray concentration of 5 pounds of formulation per 20 gallons of water. The dispersion is then drenched around chrysanthemums infested with chrysanthemum root-lesion nematodes (Pratylenchus sp.) at a rate of between ¼ and 1 pound of dithiooxamide per thousands square feet. Substantially complete control of Pratylenchus sp. is obtained.

Example 5

The nematocidal composition of Example 2C is dispersed in water at a spray concentration of 15 pounds of formulation per 100 gallons of water. Using conventional equipment, the dispersion is drenched around citrus trees at a rate of between 200 and 300 gallons per acre. Good control of the citrus burrowing nematode (*Radopholus similis*) is obtained.

*Example 6*

The nematocidal composition of Example 2E is dusted around boxwood plants at a rate of between ½ and 2 pounds of the formulation per thousand square feet. It may be left on the surface, whereupon natural rainfall or irrigation will aid penetration to the site of infestation, or it may be worked into the soil in a conventional manner to a depth of from four to six inches. This treatment provides excellent control of the boxwood spiral nematode (*Gottholdsteineria buxophila*).

*Example 7*

The nematocidal composition of Example 2B is dispersed in water at a spray concentration of 8 pounds of formulation per 100 gallons of water. The dispersion is applied to land cultivated in tobacco at a rate between 10 and 30 pounds of dithiooxamide per acre, and is then mixed with the soil to a depth of from four to six inches. Good control of the tobacco-stunt nematode (*Tylenchorenchus claytoni*) is obtained.

*Example 8*

The nemotocidal composition of Example 1 is mixed with water to give a dispersion containing between 20 and 200 parts per million of dithiooxamide. Narcissus bulbs infested with bulb and stem nematodes (*Ditylenchus dipsaci*), when dipped in the dispersion prior to planting, give rise to plants having a stronger and healthier appearance compared to the plants from untreated control bulbs.

The invention claimed is:

1. The method of controlling nematodes in soil comprising applying to said soil a nematocidal amount of dithiooxamide.

2. A composition comprising from 50% to 80% by weight of dithiooxamide, from 17% to 49.5% by weight of an inert powder diluent, and from 0.5% to 3.0% of at least one surface-active agent.

References Cited in the file of this patent

King: U.S. Dept. Agr. Handbook No. 69, 1954, p. 249.